US012596640B2

(12) United States Patent
Chen et al.

(10) Patent No.: US 12,596,640 B2
(45) Date of Patent: Apr. 7, 2026

(54) SYSTEM AND METHOD FOR MANAGING A TEST FOR TESTING AN EMBEDDED SYSTEM OF A VEHICLE

(71) Applicant: WOVEN BY TOYOTA, INC., Tokyo (JP)

(72) Inventors: Beck Chen, Tokyo (JP); Cyril Courtoy, Palo Alto, CA (US); Benjamin Ioller, Tokyo (JP); Jilada Eccleston, Tokyo (JP); Antonio Tienda Fernandez, Tokyo (JP); James Cumming, Tokyo (JP); Haitham Ahmed, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 298 days.

(21) Appl. No.: 18/393,919

(22) Filed: Dec. 22, 2023

(65) Prior Publication Data

US 2025/0208988 A1    Jun. 26, 2025

(51) Int. Cl.
*G06F 11/3698* (2025.01)
*G06F 11/3668* (2025.01)

(52) U.S. Cl.
CPC ...... *G06F 11/3698* (2025.01); *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

2011/0083121 A1* 4/2011 Dixit ................... G06F 11/3684
717/124
2018/0039566 A1* 2/2018 Luenstroth ............ G06F 8/4441
2020/0183337 A1* 6/2020 Pirog ................... G05B 13/021

OTHER PUBLICATIONS

Lee, "Requirement-Based Testing of an Automotive ECU Considering the Behavior of the Vehicle", 2011, International Journal of Automotive Technology, vol. 12 (Year: 2011).*

* cited by examiner

*Primary Examiner* — Hossain M Morshed
(74) *Attorney, Agent, or Firm* — Sughrue Mion, PLLC

(57) ABSTRACT

Provided are a system, method, and device for managing a test for testing software of an embedded system. According to embodiments, the method may be implemented by at least one processor and may include: receiving, from a user, at least one first user input associated with one or more test requirements; generating, based on the first user input, at least one test package; generating, based on the at least one test package, at least one test environment configuration file; validating the at least one test package and the at least one test environment configuration file; determining a change in the software; and based on determining the change in the software, executing the test according to the validated at least one test package and the validated at least one test environment configuration file, wherein the software of the embedded system may include an in-vehicle electronic control unit (ECU).

20 Claims, 5 Drawing Sheets

100

TEST AUTOMATION SYSTEM
200

USER INTERACTION MODULE
210

TESTING FRAMEWORK MODULE
220

CONFIG. MANAGEMENT MODULE
230

TEST BENCH MANAGEMENT MODULE
240

TEST MANAGEMENT MODULE
250

SYSTEM AND METHOD FOR MANAGING A TEST FOR TESTING AN EMBEDDED SYSTEM OF A VEHICLE

TECHNICAL FIELD

Systems and methods consistent with example embodiments of the present disclosure relate to test management, and more particularly, relate to managing a test for testing software associated with an embedded system of a vehicle.

BACKGROUND

A testing for a software is required in order to ensure that the software functions as intended, meets specified requirements, and performs reliably in various scenarios. Software testing is a crucial part of the software development life cycle (SDLC) and is performed to identify defects, errors, or bugs in the software before it is deployed to the actual system.

Whenever the software includes complex features and/or is required to interoperate with another software, the testing of the software becomes complex and may involve multiple procedures and users/stakeholders. For instance, in the context of development of vehicle-related features in a vehicle system, such as Lane Change Assist, Mobile Smart Keys, and the like, multiple Electronic Control Units (ECUs) may be developed and interoperate with each other in order to perform an intended features.

In this regard, each of the ECUs may be managed by different users and/or may be located at different geographical locations. For example, a first ECU may be developed by a first developer (e.g., an in-house development engineer of a vehicle manufacturer) located at a first location, and said first ECU may need to interoperate with a second ECU developed by a second developer (e.g., a vendor) located at a second location. As another example, the first ECU may be tested by a third user (e.g., a test engineer) located at a third location. In addition, the first ECU may interoperate with hardware (e.g., a physical ECU, etc.) located at a fourth location, and thus, the testing of the first ECU would require the involvement of the hardware.

In view of the above, in the related art, whenever a user would like to perform a testing on a software (e.g., software-based ECU), the user is required to visit a physical testing facility, at which the software and the associated test components (e.g., software components such as software-based ECU developed by other user, hardware components such as physical ECU, etc.) are collectively deployed. Accordingly, the testing of the software may be time-consuming and burdensome for the user, since the user may need to physically visit the testing facility in order to configure and to perform the test.

In addition, in the related art, it may be difficult for the user to configure, edit, and adjust a testing at the testing facility. This is because, the test components available at the testing facility may be generic and limited, and the test packages associated therewith may be restricted and may not be able to fulfill the intended test requirements or test cases, particularly when a new feature which has not been tested in the past or the software is required to be tested with a complex test case.

Further, since it may be complex and time consuming to configure the testing, the testing is often being performed upon completion of the configuration procedures, without validating the accuracy of the testing configuration. This may lead to inaccurate testing result, particularly when the user who is configuring the test is inexperience and easily introduce mistakes in configuring the test. Furthermore, even if an error in the testing configuration is found during the testing, the user may not be able to quickly rectify the error on the spot.

In addition, in the related art, the user may not have access to the information of test components available at the testing facility prior to visiting the testing facility. For instance, a vendor may not obtain the information of the available test packages and/or the associated limitations/restrictions of the testing facility which is managed by the vehicle manufacturer, and thus it is unduly difficult for the vendor to accurate build a test requirement or a test plan, without physically visiting the testing facility.

Furthermore, in the related art, majority (if not all) of the end-to-end processes of a testing, such as defining of test requirement, determining suitable test package(s) according to the test requirement, selecting and configuring suitable test environment(s), collecting associated test component(s), deploying the software to-be tested and the associated test component(s) to the test environment(s), executing the test on the software based on the determined test package(s), obtaining the test results, reproducing the test results, and the like, are performed separately and being managed manually by different users and/or on different systems, which may be inefficient, burdensome, and easy to introduce human error.

In view of the above, the development of the software in the related art may be time consuming, burdensome for the users, and may have a risk of being delayed due to uncertainties in managing the testing.

SUMMARY

According to embodiments, methods and systems are provided for efficiently and effectively managing one or more tests for testing one or more software of an embedded system of a vehicle. For instance, example embodiments of the present disclosure provide methods and systems for handling end-to-end processes of test management, such as collecting user inputs, providing test package(s), providing test environment configuration file(s), validating the test package(s) and/or the test environment configuration file(s), and executing the one or more tests.

According to embodiments, a method for managing a test for testing software of an embedded system is provided. The method may be implemented by at least one processor, and may include: receiving, from a user, at least one first user input associated with one or more test requirements; generating, based on the first user input, at least one test package; generating, based on the at least one test package, at least one test environment configuration file; validating the at least one test package and the at least one test environment configuration file; determining a change in the software; and based on determining the change in the software, executing the test according to the validated at least one test package and the validated at least one test environment configuration file. The software of the embedded system may include an in-vehicle electronic control unit (ECU).

According to embodiments, the method may further include: publishing the validated at least one test package and the validated at least one test environment configuration file by: storing the validated at least one test package and the validated at least one test environment configuration file to one or more storage mediums accessible by other users. Further, the method may further include: collecting one or more test results associated with the test; generating at least one graphical user interface (GUI) including the one or more test results; and presenting, to the user, the at least one GUI.

According to embodiments, the first user input may include information associated with at least one user-defined test case, and the generating the at least one test package may include: generating, based on the at least one user-defined test case, at least one test scenario template; obtaining, based on the at least one test scenario template, one or more test package artifacts; and combining the at least one test scenario template with the one or more test package artifacts to generate the at least one test package.

According to embodiments, the generating the at least one test environment configuration file may include: receiving, from the user, at least one second user input associated with at least one user-defined test plan; generating, based on the second user input and the at least one test package, at least one test plan template; generating, by adding the at least one user-defined test case to the at least one test plan template, at least one test plan; receiving, from the user, at least one third user input associated with at least one user-defined test cycle; and generating, based on the third user input and the at least one test plan, the at least one test environment configuration file. The at least one test environment configuration file may include information defining configuration of at least one test bench.

According to embodiments, the validating the at least one test package and the at least one test environment configuration file may include: performing a pre-testing on the software based on the at least one test package and the at least one test environment configuration file; presenting, to the user, a result of the pre-testing; receiving, from the user, at least one fourth user input associated with one of: an approval on the result of the pre-testing and a rejection on the result of the pre-testing; based on determining that the fourth user input is associated with the approval, determining that the at least one test package and the at least one test environment configuration file are valid; and based on determining that the fourth user input is associated with the rejection, determining that the at least one test package and the at least one test environment configuration file are invalid.

According to embodiments, the determining the change in the software comprises: obtaining a current status of the software; and comparing the current status with a last known status of the software to determine whether or not the change occurs in the software. The change in the software may include a breaking change satisfying one or more conditions defined in the at least one test package.

According to embodiments, the executing the test may include: generating, based on the validated at least one test environment configuration file, at least one test bench associated with at least one test environment for testing the software; selecting, based on the at least one test bench, at least one node associated with at least one test environment defined in the at least one test bench; deploying the software to the selected at least one node; and performing, based on the validated at least one test package, the test for testing the software in the selected at least one node.

According to embodiments, a system for managing a test for testing software of an embedded system may be provided. The system may include: a storage storing instructions; and at least one processor configured to execute the instructions to: receive, from a user, at least one first user input associated with one or more test requirements; generate, based on the first user input, at least one test package; generate, based on the at least one test package, at least one test environment configuration file; validate the at least one test package and the at least one test environment configuration file; determine a change in the software; and based on determining the change in the software, execute the test according to the validated at least one test package and the validated at least one test environment configuration file. The software of the embedded system may include an in-vehicle electronic control unit (ECU).

According to embodiments, the at least one processor may be further configured to execute the instructions to: publish the validated at least one test package and the validated at least one test environment configuration file by: storing the validated at least one test package and the validated at least one test environment configuration file to one or more storage mediums accessible by other users. Further, the at least one processor may be further configured to execute the instructions to: collect one or more test results associated with the test; generate at least one graphical user interface (GUI) including the one or more test results; and present, to the user, the at least one GUI.

According to embodiments, the first user input may include information associated with at least one user-defined test case, and wherein the at least one processor may be configured to execute the instructions to generate the at least one test package by: generating, based on the at least one user-defined test case, at least one test scenario template; obtaining, based on the at least one test scenario template, one or more test package artifacts; and combining the at least one test scenario template with the one or more test package artifacts to generate the at least one test package.

According to embodiments, the at least one processor may be configured to execute the instructions to generate the at least one test environment configuration file by: receiving, from the user, at least one second user input associated with at least one user-defined test plan; generating, based on the second user input and the at least one test package, at least one test plan template; generating, by adding the at least one user-defined test case to the at least one test plan template, at least one test plan; receiving, from the user, at least one third user input associated with at least one user-defined test cycle; and generating, based on the third user input and the at least one test plan, the at least one test environment configuration file. The at least one test environment configuration file may include information defining configuration of at least one test bench.

According to embodiments, the at least one processor may be configured to execute the instructions to validate the at least one test package and the at least one test environment configuration file by: performing a pre-testing on the software based on the at least one test package and the at least one test environment configuration file; presenting, to the user, a result of the pre-testing; receiving, from the user, at least one fourth user input associated with one of: an approval on the result of the pre-testing and a rejection on the result of the pre-testing; based on determining that the fourth user input is associated with the approval, determining that the at least one test package and the at least one test environment configuration file are valid; and based on determining that the fourth user input is associated with the rejection, determining that the at least one test package and the at least one test environment configuration file are invalid.

According to embodiments, the at least one processor may be configured to execute the instructions to determine the change in the software by: obtaining a current status of the software; and comparing the current status with a last known status of the software to determine whether or not the change occurs in the software. The change in the software may include a breaking change satisfying one or more conditions defined in the at least one test package.

According to embodiments, the at least one processor may be configured to execute the instructions to execute the test by: generating, based on the validated at least one test environment configuration file, at least one test bench associated with at least one test environment for testing the software; selecting, based on the at least one test bench, at least one node associated with at least one test environment defined in the at least one test bench; deploying the software to the selected at least one node; and performing, based on the validated at least one test package, the test for testing the software in the selected at least one node.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein.

DETAILED DESCRIPTION

Figure 1:
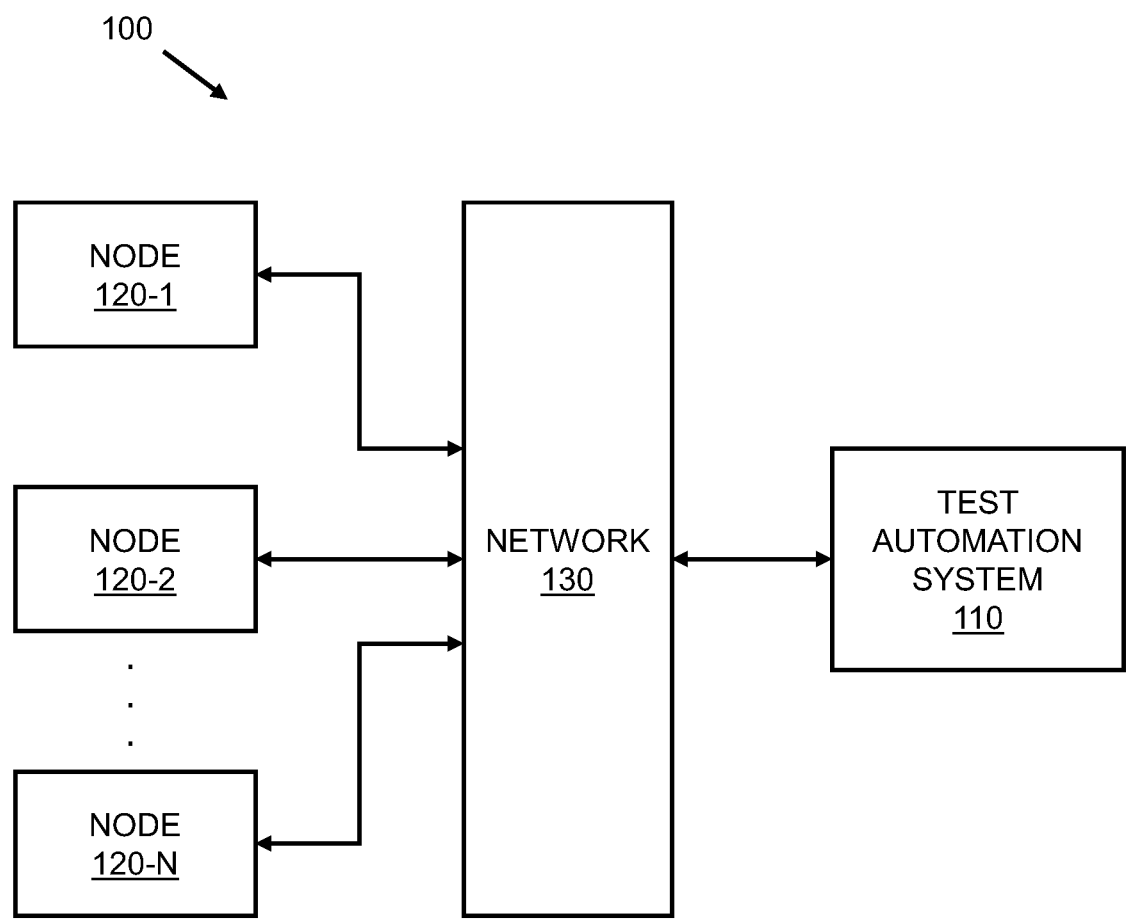
FIG. 1 illustrates a block diagram of an example system architecture for managing a test, according to one or more embodiments.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In addition, the term "vehicle" or the like, as used herein, may refer to any motorized and/or mechanical machine which may carry or transport people and/or cargo, such as: a car, a truck, a motorcycle, a bus, a bicycle, a mobility scooter, and the like.

Example embodiments consistent with the present disclosure provide methods, systems, and apparatuses for managing a test for testing one or more software of an embedded system, such as an in-vehicle ECU. Specifically, methods, systems, apparatuses, or the like, of example embodiments may automatically manage a test as per user-defined requirements. According to embodiments, methods, systems, apparatuses, or the like, of example embodiments may automatically generate one or more test packages and one or more test environment configuration files based on one or more user inputs, and may automatically execute a test according to the same.

In some implementations, the generated one or more test packages and/or the generated one or more test environment configuration files may be validated, before being utilized for executing the testing. Upon validation of the generated one or more test packages and/or the generated one or more test environment configuration files, the methods, systems, apparatuses, or the like, of example embodiments may automatically determining a change in the software based thereon, and may automatically execute the test based on determining the change in the software. Further, the validated test package(s) and/or the validated test environment configuration file(s) may be published and be accessible by other users.

According to embodiments, upon executing the test on the software, the methods, systems, apparatuses, or the like, of example embodiments may automatically collect the test result(s) and present the same to the associated user(s). Further, the methods, systems, apparatuses, or the like, of example embodiments may receive one or more user inputs for updating one or more generated test package(s) and/or one or more generated test environment configuration file(s), and may automatically update the same accordingly.

Accordingly, methods, systems, apparatuses, or the like, of example embodiments may automatically generate or update one or more test components according to the user input(s), based on the real-time or near real-time status and test requirements. As a result, one or more test benches may be provided and be utilized on-demand, without geographical restrictions.

To this end, example embodiments of the present disclosure may automatically manage the end-to-end processes of a testing, according to one or more user-defined requirements. The user(s) may remotely define one or more test requirements, without physically travelling to the testing facility as required in the related art. Ultimately, example embodiments of the present disclosure enable the development of the software to be performed more efficiently, the burden of the users may be significantly reduced, the development time may be significantly reduced, and the cost and efforts for planning physical visit or travelling plan to physical testing facility may be significantly reduced.

It is contemplated that features, advantages, and significances of example embodiments described hereinabove are merely a portion of the present disclosure, and are not intended to be exhaustive or to limit the scope of the present disclosure. Further descriptions of the features, components, configuration, operations, and implementations of example embodiments of the present disclosure, as well as the associated technical advantages and significances, are provided in the following.

FIG. 1 illustrates a block diagram of an example system architecture 100 for managing a test, according to one or more embodiments. As illustrated in FIG. 1, system architecture 100 may include a test automation system 110, a plurality of nodes 120-1 to 120-N, and a network 130.

In general, the test automation system 110 may be communicatively coupled to the plurality of nodes 120-1 to 120-N via the network 130, and may be configured to interoperate with the plurality of nodes 120-1 to 120-N to manage a test (or one or more associated information or data). Descriptions of example modules and components which may be included in the test automation system 110, as well as descriptions of the associated use cases, are provided in below with reference to FIG. 2 to FIG. 4.

Each of the plurality of nodes 120-1 to 120-N may include one or more devices, equipment, systems, or any other suitable components which may receive, host, store, utilize, deploy, process, provide or the like, one or more artifacts or components which constitute a test.

For instance, the node 120-1 may include a device or an equipment (e.g., a user equipment, a personal computer, a server or a server cluster, a workstation, etc.) which may be utilized for building, storing, executing, simulating, executing, or the like, one or more computer executable software applications, such as one or more virtualized ECUs, one or more emulated ECUs, and/or any other suitable software-based components (e.g., vehicle model, Data Communications Module (DCM) model, Heating, Ventilation, and Air Conditioning (HVAC) model, etc.), of a vehicle system. As another example, the node 120-1 may include one or more hardware components, such as one or more fully developed physical ECUs, one or more partially developed physical ECUs, one or more vehicle hardware (e.g., powertrain, engine, etc.), or the like.

According to embodiments, one or more of the plurality of nodes 120-1 to 120-N may include one or more interfaces, each of which may be configured to communicatively coupled the associated node to the test automation system 110. For instance, the one or more of the plurality of nodes may include a hardware interface, a software interface (e.g., a programmatic interface, application program interface (API), etc.), and/or the like.

According to embodiments, at least a portion of the plurality of nodes 120-1 to 120-N are located at a geographical location different from the test automation system 110, and/or different from another portion of the plurality of nodes. According to embodiments, at least a portion of the plurality of nodes 120-1 to 120-N are associated with users located at different geographical locations.

For instance, the node 120-1 may be associated with a first user (e.g., a development engineer) who is responsible in developing a first ECU, and the node 120-2 may be associated with a second user (e.g., a test engineer) who is responsible to test the first ECU, wherein the first user may locate at a first location and the second user may locate at a second location, and wherein the first location may be different from the second location. Alternatively or additionally, the first node 120-1 may be associated with the first user who is responsible in developing the first ECU, and the node 120-2 may be associated with a second user who is responsible in developing a second ECU, wherein the first ECU may interoperate with the second ECU, the first user may locate at a first location and the second user may locate at a second location, and wherein the first location may be different from the second location.

According to embodiments, at least a portion of the plurality of nodes 120-1 to 120-N may be associated with one or more test environments. For instance, said portion of nodes may have at least one software-based test environment (e.g., software-in-the-loop (SIL) test environment, virtual ECU (V-ECU) test environment, model-in-the-loop (MIL) test environment, processor-in-the-loop (PIL) test environment, etc.) and/or at least one hardware-based test environment (e.g., hardware-in-the-loop (HIL) test environment) communicatively coupled thereto (e.g., wired coupling, wireless coupling, etc.) or deployed thereto.

Further, at least a portion of the plurality of nodes 120-1 to 120-N may include one or more storage mediums, such as a server or a server cluster, which may be configured to store, publish, or the like, one or more data or information (or information associated therewith) provided by the test automation system 110 and/or another portion of the plurality of nodes 120-1 to 120-N.

The network 130 may include one or more wired and/or wireless networks, which may be configured to couple the plurality of nodes 120-1 to 120-N to the test automation system 110. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

According to embodiments, the network 130 may include a virtual network, which may include one or more physical network components (e.g., Ethernet, WiFi module, telecommunication network hardware, etc.) with one or more virtualized network functions (e.g., a control area network (CAN) bus, etc.) implemented therein. Additionally or alternatively, the network 130 may include at least one parameters network.

Figure 2:
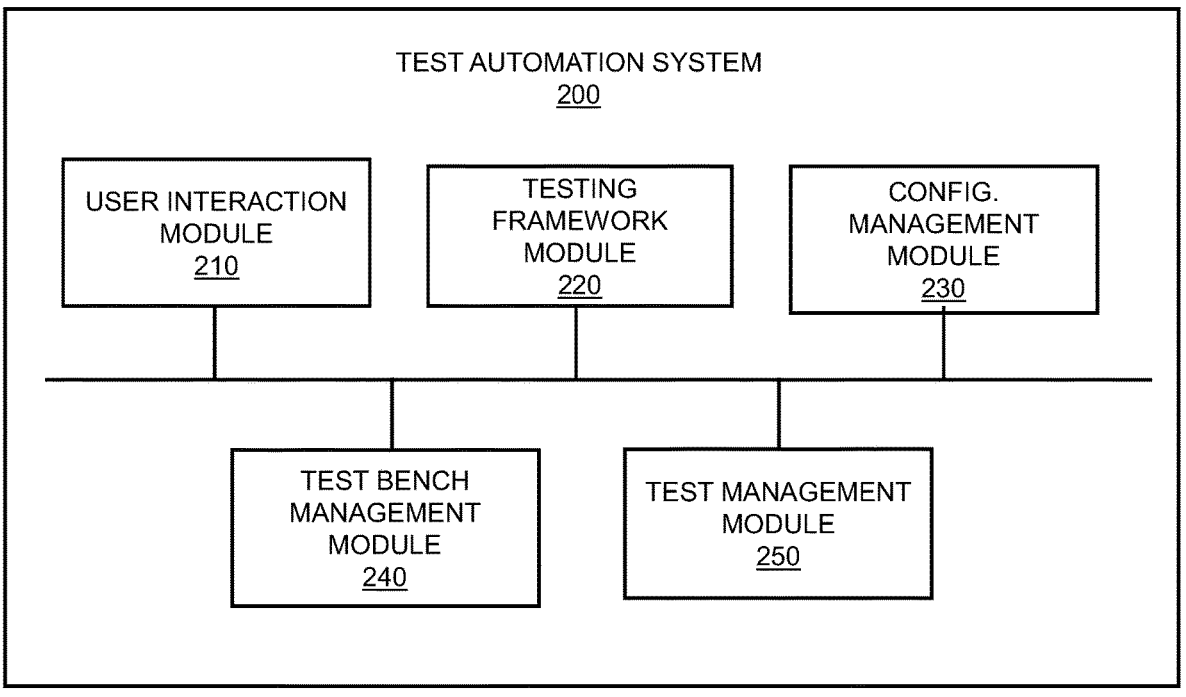
FIG. 2 illustrates a block diagram of example modules of a test automation system, according to one or more embodiments.

Referring next to FIG. 2, which illustrates a block diagram of example modules of a test automation system 200, according to one or more embodiments. Test automation system 200 may correspond to the test automation system 110 described above with reference to FIG. 1, thus the features described herein with reference to systems 110 and 200 may be applicable to one another, unless being explicitly described otherwise.

As illustrated in FIG. 2, the test automation system 200 may include at least one user interaction module 210, at least one testing framework module 220, at least one configuration management module 230, at least one test bench management module 240, and at least one test management module 250. As will be further described in below, one or more of the modules 210-250 may be defined in computer-executable instructions or programming codes which, when being executed by one or more processors (e.g., processor 430 described below with reference to FIG. 4, etc.), cause the one or more processors to perform the operations associated therewith. Alternatively or additionally, one or more of the modules 210-250 may include one or more hardware components (e.g., components described below with reference to FIG. 4, etc.) which may be configured to perform the operations associated therewith. To this end, the modules 210-250 may be configured to interoperate with each other to manage one or more tests, as described in the following.

The user interface module 210 (may be referred to as "module 210" herein) may be configured to interact with one or more users. According to embodiments, the module 210 may generate one or more graphical user interfaces (GUIs) to engage the one or more users. For instance, the module 210 may generate one or more GUIs to a user and may receive one or more user inputs from the user.

According to embodiments, the module 210 may be configured to receive, from the one or more users, the one or more user inputs which may define one or more user-intended test requirements, such as: user-intended test case, user-intended test plan, user-intended test cycle, and/or the like. As will be further described in below, said one or more user inputs may be utilized in generating one or more test packages and/or one or more test environment configuration files. Further, the module 210 may also be configured to receive, from the one or more users, one or more inputs which include information for updating one or more generated test components, in a similar manner.

According to embodiments, the module 210 may generate one or more GUIs to present a status of a testing to the user. For instance, the module 210 may present, in the one or more GUIs, a status of a configured testing (e.g., pending, executed, failed, etc.), a result of a validation-test, a result of an actual test, and/or the like.

The testing framework module 220 (may be referred to as "module 220" herein) may be configured to generate one or more test packages and/or one or more test environment configuration files. According to embodiments, the module 220 may be configured to obtain one or more user inputs from the module 210, and may be configured to generate one or more test packages and/or one or more test environment configuration files based on the obtained one or more user inputs.

For instance, the module 220 may generate, based on the one or more user inputs, one or more test packages, and generate, based on the one or more test packages, one or more test environment configuration files. In some implementation, the one or more user inputs may include information associated with one or more user-defined test cases, and the module 220 may generate the one or more test packages by: creating, based on the one or more user-defined test cases, one or more test scenario templates, obtaining (e.g., creating, searching, retrieving, etc.) one or more test package artifacts associated with the one or more test scenario templates from among a plurality of nodes associated with the test automation system (e.g., nodes 120-1 to 120-N), and combining the one or more test scenario templates with the one or more test package artifacts to generate the one or more test packages.

In this regard, the terms "test case" described herein may refer to a specific set of conditions and/or steps that are designed to verify the functionality or behavior of the software (or the system under test). The test case may define one or more actions and expected outcomes for a particular test scenario. According to embodiments, the test case may include one or more of: a test case ID (e.g., a unique identifier or a set of number assigned to the test case for tracking and reference purpose), a test objective (e.g., description or specification of the goal or purpose of the test case), at least one test condition (e.g., precondition or initial state required for executing the test case, specific setup or configuration needed in order to trigger the test execution, etc.), at least one test step (e.g., action or operation to be performed to execute the test case, necessary inputs or interactions with the software, etc.), at least one expected result (e.g., the anticipated outcomes or behaviors that are expected from the software when the test case is executed successfully, etc.), and any other suitable information.

Further, the terms "test package" described herein may refer to a collection of test cases, test scripts/algorithms, test data, test dependencies, test execution instructions, test cycle, and other related resources that are collectively organized together for the purpose of testing a specific software (e.g., a specific ECU). By generating and providing a "test package" based on the user-defined test requirement (included in the first user input), the module 220 may provide a structured approach to planning and executing a test in the user-intended manner while ensuring that all necessary test activities are included and properly documented.

Furthermore, the terms "test environment configuration file" described herein may refer to a file or a document which includes information for obtaining (e.g., retrieving, creating, updating, etc.) and for configuring at least one test environment associated with the software or system under test. For instance, the test environment configuration file may include information associated with configuration of one or more test environments required for testing the software (e.g., configuration of software-based test environment(s) required for testing the software and the associated software-based component, configuration of hardware-based test environment(s) required for testing a hardware associated with the software, etc.), information associated with a test plan, information associated with test scenario(s), information associated with test execution condition(s), and information associated with test bench configuration.

The terms "test scenario" described herein may refer to a collection or sequence of related test cases that are grouped together to achieve a common testing objective. Each test case within a test scenario focuses on a specific aspect or condition, while the test scenario provides a larger context or flow.

The terms "test plan" described herein may refer to a collection of information which outlines the approach, objective, scope, procedure, and configuration of testing the software. The test plan may include a collection or a sequence of test scenarios, test execution procedures, and configuration information such as test bench configuration and ECU test configuration.

The terms "test bench" described herein may refer to information or parameters, such as a set of tools, procedures, functional compositions, fixtures, or the like, which, when being compiled or utilized, enable a testing to be performed in a desired condition or configuration. Simply put, the test bench defines the test environment for testing the software.

Additionally or alternatively, the one or more user inputs may include information associated with one or more user-defined test plans and information associated with one or more user-defined test cycles, and the module 220 may generate the one or more test environment configuration files by: generating, based on the one or more user-defined test plans and the one or more test packages, one or more test plan templates, generating one or more test plans by adding the one or more user-defined test cases to the one or more test plan templates, and generating, based on the one or more user-defined test cycles and the one or more test plans, the one or more test environment configuration files.

Additionally or alternatively, the module 220 may update, based on the one or more user inputs, one or more generated test packages. In some implementation, the one or more user inputs may include information associated with one or more user-defined updated test cases, and the module 220 may update the one or more generated test packages by: generating, based on the one or more user-defined updated test cases, one or more updated test scenario templates, obtaining (e.g., creating, searching, retrieving, etc.) one or more test package artifacts associated with one or more updated test scenario templates from among a plurality of nodes associated with the test automation system (e.g., nodes 120-1 to 120-N), and combining the one or more updated test scenario templates with the one or more test package artifacts to generate one or more updated test packages. According to embodiments, the module 220 may determine one or more differences among the one or more user-defined updated test cases and the current user-defined test case(s), and may generate the one or more update the test scenario templates by modifying one or more generated test scenario templates to reflect the one or more differences.

According to embodiments, the module 220 may interoperate with the configuration management module 230, such as storing or committing one or more generated data (e.g., test package, test environment configuration file, updated test package, etc.) to the configuration management module 230, receiving from the configuration management module 230 a trigger for executing a test, providing to the configuration management module 230 one or more test results, test logs, test traces, or the like (which received from the test management module 250), and the like.

According to embodiments, the module 220 may interoperate with the test bench management module 240, such as providing information or data to the test bench management module 240 to initialize a test bench provision, and the like. According to embodiments, the module 220 may interoperate with the test management module 250, such as providing one or more generated/validated data (e.g., test package, etc.) to the test management module 250, receiving one or more test results, test logs, test traces, or the like, from the management module 250, and the like.

The at least one configuration management module 230 (may be referred to as "module 230" herein) may be configured to manage information or configuration associated with the testing. For instance, the module 230 may receive one or more generated data (e.g., test package, test environment configuration file, updated test package, etc.) from the module 220, and may then organize and store said one or more generated data therein. According to embodiments, the module 230 may include one or more storage mediums (e.g., storage 420 described below with reference to FIG. 4, a hosting server, a server cluster, etc.).

Further, the module 230 may also be configured to receive, from one or more nodes associated with the test automation system 200 (e.g., nodes 120-1 to 120-N, etc.), one or more system under test (e.g., software to-be tested such as software-based ECU, etc.), as well as one or more components associated therewith (e.g., one or more software with which the system under test interoperate with, such as one or more software-based ECU, one or more vehicle-related models, information of hardware associated with the system under test, etc.), and to store the same therein.

According to embodiments, the module 230 may be configured to continuously (or periodically) determine a change in the system under test. For instance, the module 230 may obtain, based on a test cycle defined in at least one test package of the system under test, a current status of the system under test, and may compare the current status with a last known status of the system under test to determine whether or not the change occurs in the system under test. According to embodiments, the change in the system under test comprises a breaking change satisfying one or more conditions defined in the at least one test package. Accordingly, upon determining the change in the system under test, the module 230 may generate and send a message (e.g., a notification message, etc.) to the module 220 for triggering the test execution.

The test bench management module 240 (may be referred to as "module 240" herein) may be configured to provide one or more test benches for a testing. For instance, the module 240 may receive information or data, such as test environment configuration file (which include test bench configuration information), from the module 220 whenever a test plan execution is triggered, and may obtain (e.g., retrieve, create, update, etc.) the one or more test benches based on the received information. According to embodiments, the module 240 may provide the one or more test benches to the test management module 250.

The test management module 250 (may be referred to as "module 250" herein) may be configured to execute one or more testing. For instance, the module 250 may receive one or more test benches from the module 240, may initialize one or more test environments (e.g., software-based environments and/or hardware-based environments, etc.) according to the one or more test benches. Additionally, the module 250 may receive one or more test packages from the module 220, and may execute the one or more testing based on the one or more initialized test environments according to the one or more test packages.

To this end, the modules in the test automation system 200 may be configured to interoperate with each other to facilitate end-to-end automation in managing a test for a user. The user may simply provide the intended test requirements (e.g., intended test case, intended test plan, intended test cycle, etc.) to the test automation system 200, and the test automation system 200 may automatically generate the required configuration data (e.g., test package(s), test environment configuration file(s), test bench(s), etc.) based on the user-defined test requirements, automatically monitor the status of the system under test (e.g., a software), automatically trigger the execution of the test, and automatically collect and present the test result(s) to the user.

In the following, example use cases of the modules in the test automation system 200, according to one or more embodiments, are described with reference to FIG. 3A and FIG. 3B. One or more of the modules 210-250 illustrated in FIG. 3A and FIG. 3B are similar to modules 210-250 described hereinabove with reference to FIG. 2.

Figure 3A:
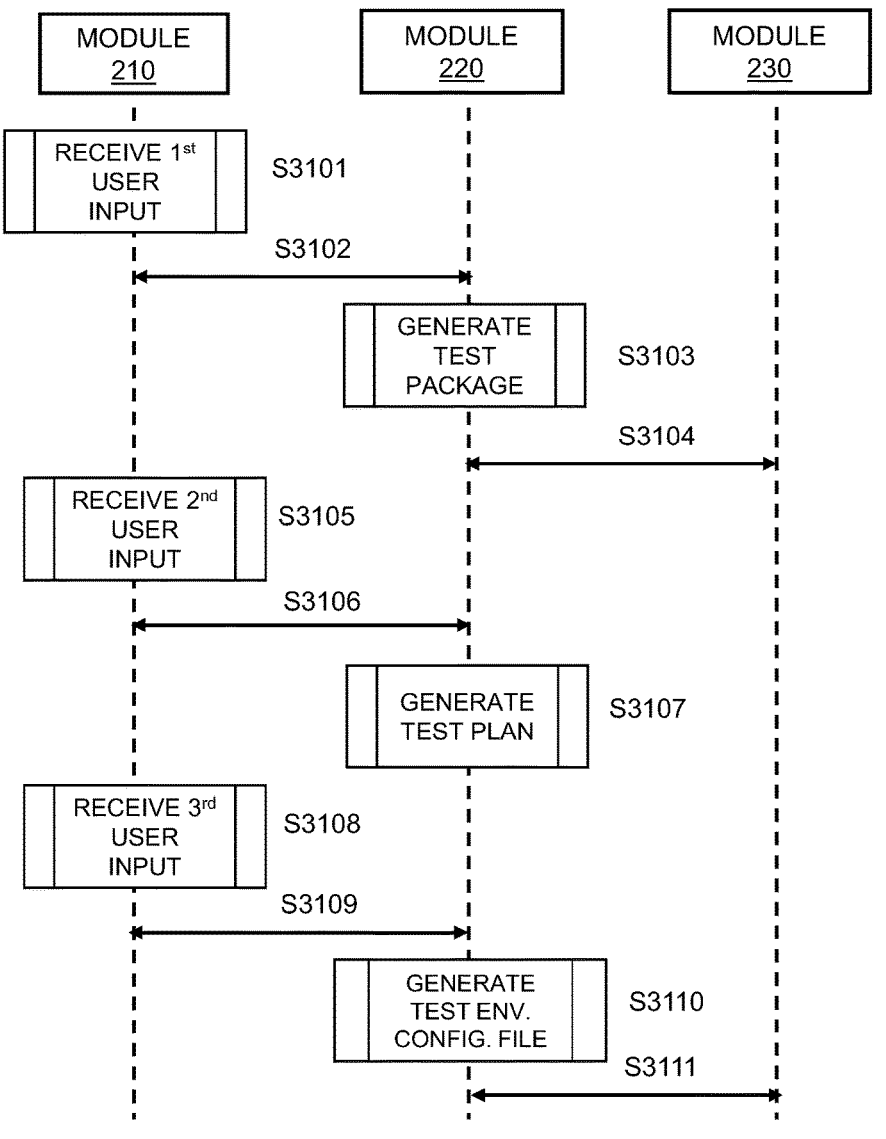
FIG. 3A illustrates a flow diagram of an example use case of preparation of testing, according to one or more embodiments.
Figure 3B:
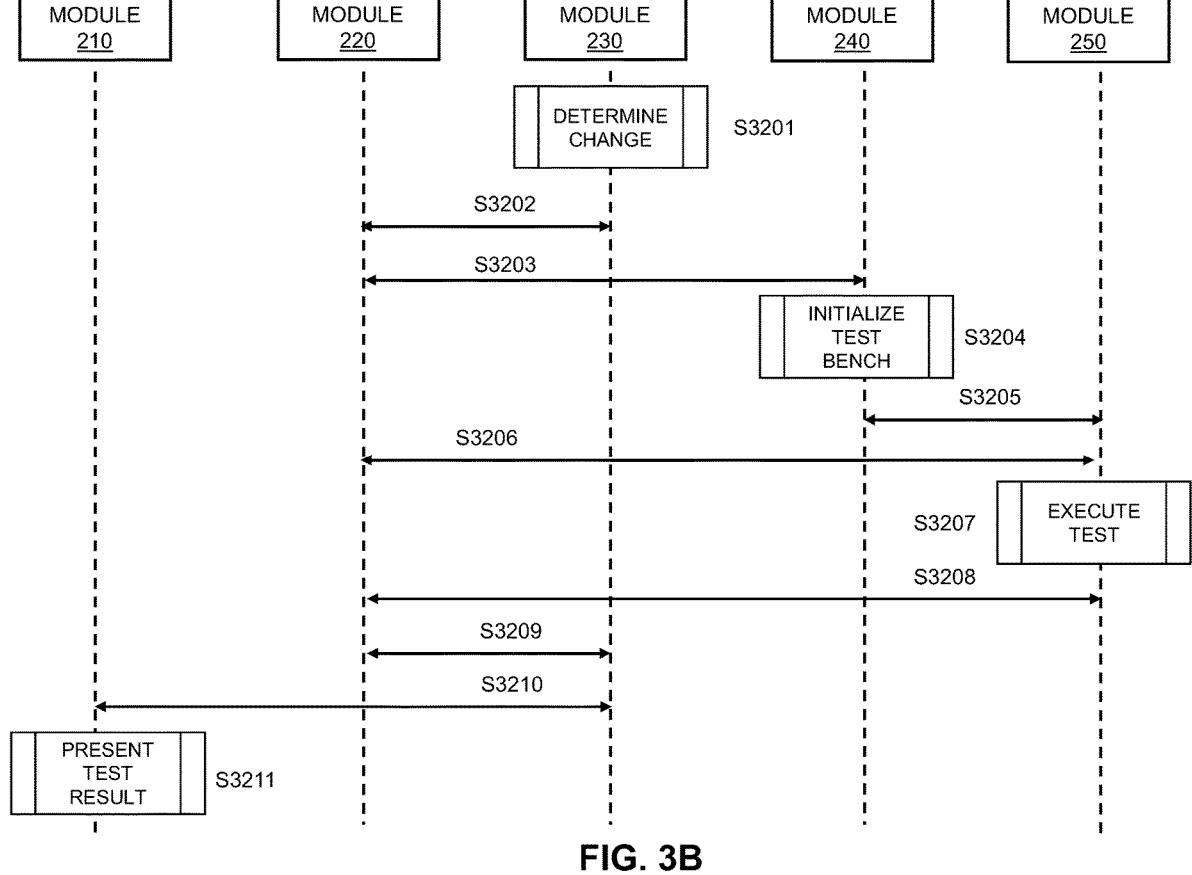
FIG. 3B illustrates a flow diagram of an example use case of test execution, according to one or more embodiments.

Referring first to FIG. 3A, which illustrates a flow diagram of an example use case of preparation of a testing, according to one or more embodiments. As illustrated in FIG. 3A, at operation S3101, the module 210 may be configured to receive, from a user (via a node associated with the user), at least one first user input. The first user input may be associated with one or more test requirements, and may include information associated with at least one user-defined test case.

At operation S3102, the module 210 may provide the first user input (received at operation S3101) to the module 220. Accordingly, at operation S3103, the module 220 may be configured to generate, based on the first user input, at least one test package. For instance, the module 220 may be configured to generate, based on the at least one user-defined test case (included in the first user input), at least one test scenario template, and to obtain, from a plurality of nodes associated with the test automation system 200 (e.g., nodes 120-1 to 120-N, etc.) and based on the at least one test scenario template, one or more test package artifacts. Accordingly, the module 220 may combine the at least one test scenario template with the one or more test package artifacts to generate the at least one test package.

Referring still to FIG. 3A, upon generating the at least one test package, at operation S3104, the module 220 may provide the generated test package to module 230 for storing. Subsequently, at operation S3105, the module 210 may be configured to receive, from the user, at least one second user input. The at least one second user input may be associated with at least one user-defined test plan.

Accordingly, at operation S3106, the module 210 may provide the second user input to the module 220. Next, at operation S3107, the module 220 may generate, based on the second user input, at least one test plan. For instance, the module 220 may generate, based on the second user input and the at least one test package (generated at operation S3103), at least one test plan template, and may generate the at least one test plan by adding the at least one user-defined test case to the at least one test plan template.

Further, at operation S3108, the module 210 may be configured to receive, from the user, at least one third user input. The at least one third user input may be associated with at least one user-defined test cycle, which defines how frequently the system (e.g., module 230) should determine whether or not a testing should be executed. Accordingly, at operation S3109, the module 210 may provide the third user input to the module 220. Next, at operation S3110, the module 220 may be configured to generate at least one test environment configuration file. The test environment configuration file may include configuration of one or more test environments required for testing the system under test, information associated with the test plan, information associated with test scenarios, information associated with test execution condition(s), and/or information associated with test bench configuration.

Upon generating the test environment configuration file, at operation S3111, the module 220 may provide the same to module 230 for storing. In some implementations, prior to providing the test package and/or the test environment configuration file to the module 230, the module 220 may validate the test package and/or the test environment configuration file to ensure that the associated content is accurate and fulfills the user's requirements.

According to embodiments, the module 220 may validate the test package and/or the test environment configuration file by: performing a pre-testing on the system under test based on the test package and/or the test environment configuration file, presenting a result of the pre-testing to the user, and receiving, from the user, at least one fourth user input associated with one of: an approval on the result of the pre-testing and a rejection on the result of the pre-testing. Accordingly, based on determining that the fourth user input is associated with the approval, the module 220 may determine that the test package and/or the test environment configuration file is valid. Otherwise, based on determining that the fourth user input is associated with the rejection, the module 220 may determine that the test package and/or the test environment configuration file is invalid. The pre-testing may be performed at a first node, which may be different from a node (e.g., a second node) on which the actual testing is performed. In this way, the test automation system may ensure that the validity of the test package and/or the test environment configuration file, before publishing the same to the module 230.

To this end, the preparation of the testing is completed, and the module 230 may be configured to continuously (or periodically) monitor a status of the system under test (according to the user-defined test cycle, etc.) and automatically trigger the test execution when required. Descriptions of an example use case associated therewith are described in the following, with reference to FIG. 3B.

Referring to FIG. 3B, which illustrates a flow diagram of an example use case of test execution, according to one or more embodiments. Operations in FIG. 3B may be performed subsequent to the operations described above with reference to FIG. 3A.

As illustrated in FIG. 3B, at operation S3201, the module 230 may determine a change in the system under test (e.g., a software, etc.). For instance, the module 230 may continuously (or periodically) obtain (from one or more nodes associated with the system under test) a current status of the system under test, and may compare the current status with a last known status of the system under test (pre-obtained by and stored within the module 230) so as to determine whether or not the system under test has changed from the last known status. According to embodiments, the module 230 may perform operation S3201 according to user-defined test cycle (the associated information is included in the associated test package).

In addition, upon determining the change, the module 230 may determine whether or not the change is a breaking change. For instance, the module 230 may determine whether or not the change satisfies one or more conditions defined in the at least one test package. Based on determining that the change satisfies the one or more conditions, the module 230 may determine that the change is the breaking change. In this regard, the terms "breaking change" may refer to a change or modification in the system under test which breaks or disrupts the normal functioning of the system under test.

Accordingly, at operation S3202, the module 230 may generate and send a message (e.g., a notification flag, a warning message, etc.) to the module 220 to inform about the determined change in the system under test. Subsequently, at operation S3203, the module 220 may trigger a test execution by: collecting (from the module 230, etc.) the test package(s) and test environment configuration file(s) associated with the system under test, and providing the test environment configuration file(s) to the module 240.

At operation S3204, the module 240 may initialize one or more test benches. Specifically, the module 240 may obtain (e.g., retrieve, create, configure, etc.), based on the test environment configuration file(s), the one or more test benches for performing the test. Accordingly, at operation S3205, the module 240 may provide the one or more test benches to the module 250. Further, at operation S3206, the module 220 may provide the test package(s) to the module 250. In this regard, it can be understood that the module 220 may perform operation S3206 concurrently with operation S3203, S3204, or S320, without departing from the scope of the present disclosure.

At operation S3207, the module 250 may execute the test for testing the system under test. Specifically, the module 250 may determine one or more nodes (e.g., nodes 120-1 to 120-N) which may be able to provide test environments (e.g., software-based test environment, hardware-based test environment, etc.) according to the one or more test bench, may deploy the system under test (along with the associated test components) to the determined one or more nodes, and may perform the test on the one or more nodes based on the test package(s).

Upon performing the test, at operation S3208, the module 220 may collect, from the module 250, one or more test results associated with the test. Accordingly, at operation S3209, the module 220 may archive the collected one or more test results by sending said one or more test results to the module 230. Upon storing the one or more test results, at operation S3210, the module 230 may provide the one or more test results to the module 210. Accordingly, at operation S3211, the module 210 may generate one or more GUIs including the one or more test results, and may then present the one or more GUIs to the user (via a node associated with the user).

It can be understood that the operations of modules 210-250 described hereinabove are merely examples of possible embodiments, and the scope of the present disclosure should not be limited therewith. Specifically, one or more of the modules 210-250 may be configured to operate in a manner different from as described herein, without departing from the scope of the present disclosure.

According to embodiments, one or more of the modules 210-250 in the test automation system may be defined in computer-executable instructions or programming codes, and may be associated with one or more hardware components of the test automation system. For instance, the computer-executable instructions defining one or more of the modules 210-250 may be stored in one or more memory storages of the test automation system, and may be executable by one or more processors of the test automation system to perform one or more operations associated with the modules 210-250 as described herein.

Figure 4:
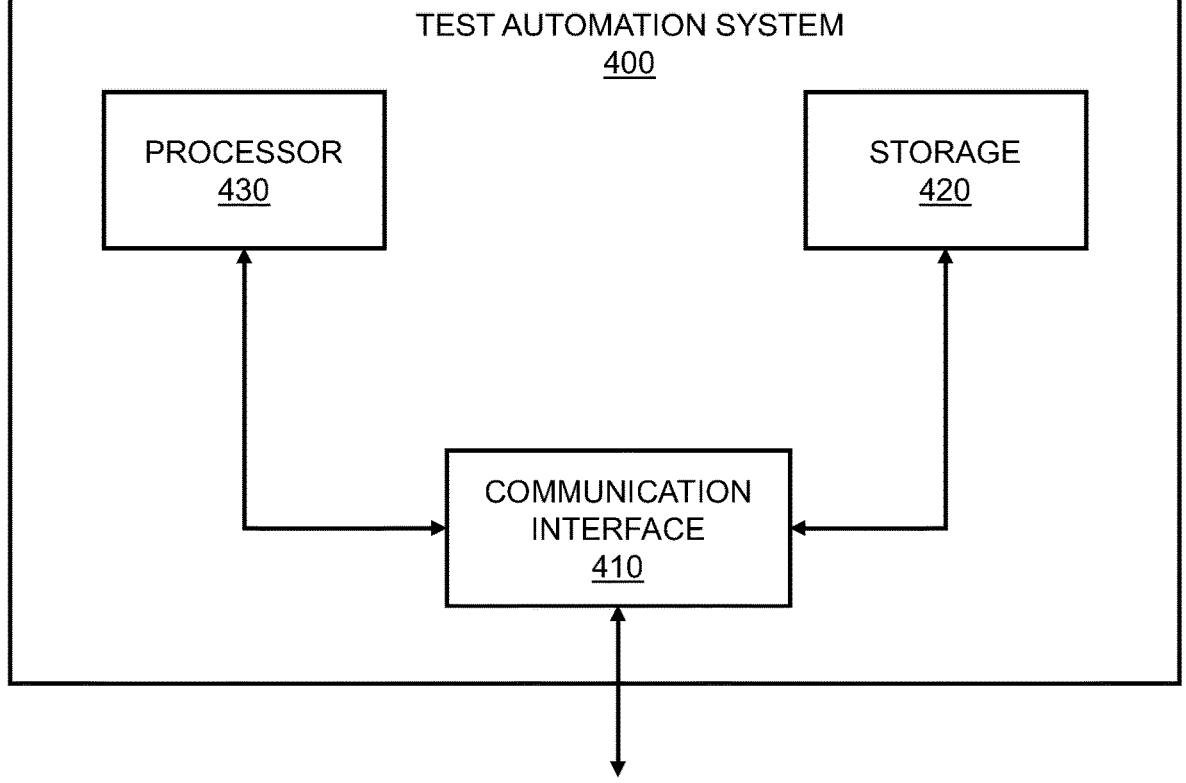
FIG. 4 illustrates a block diagram of example components of a test automation system, according to one or more embodiments.

Referring to FIG. 4, which illustrates a block diagram of example components of a test automation system 400, according to one or more embodiments. The test automation system 400 may be similar to test automation system 200 in FIG. 2, and the components included therein may be configured to perform one or more operations of one or more modules of test automation system 200.

As illustrated in FIG. 4, the test automation system 400 may include at least one communication interface 410, at least one storage 420, and at least one processor 430, although it can be understood that the test automation system 400 may include more or less components than as illustrated, and/or the components included therein may be arranged in any a manner different from as illustrated, without departing from the scope of the present disclosure. For instance, in some implementations, the test automation system 400 may include a plurality of storages 420 and a plurality of processors 430, each of which may be dedicated for performing operations of one of the modules 210-250.

The communication interface 410 may include a transceiver-like component (e.g., a transceiver, a separate receiver and transmitter, etc.) that enables the test automation system 400 (or one or more components included therein) to communicate with one or more components external to the test automation system 400, such as via a wired connection, a wireless connection, or a combination of wired and wireless connections. For instance, the communication interface 410 may couple the test automation system 400 (or one or more components included therein) to a plurality of nodes (e.g., nodes 120-1 to 120-N in FIG. 1, etc.) to thereby enable them to communicate and to interoperate with each. As another example, the communication interface 410 may enable the components of the test automation system 400 to communicate with each other. For instance, the communication interface 410 may couple the storage 420 to the processor 430 to thereby enable them to communicate and to interoperate with each other.

According to embodiments, the communication interface 410 may include a hardware-based interface, such as a bus interface, an Ethernet interface, an optical interface, a coaxial interface, an infrared interface, a radio frequency (RF) interface, a universal serial bus (USB) interface, a Wi-Fi interface, a cellular network interface, a software interface, or the like. According to embodiments, communication interface 410 may include at least one controller area network (CAN) bus configurable to communicatively couple the components of the test automation system 400 (e.g., storage 420, processor 430, etc.) to a plurality of nodes (e.g., nodes 120-1 to 120-N). Additionally or alternatively, the communication interface 410 may include a software-based interface, such as an application programming interface (API), a virtualized network interface (e.g., virtualized CAN bus, etc.), or the like.

According to embodiments, the communication interface 410 may be configured to receive information from one or more components external to the test automation system 400 and to provide the same to the processor 430 for further processing and/or to the storage 420 for storing. For instance, the communication interface 410 may receive, from the plurality of nodes, one or more user inputs defining one or more test requirements (e.g., test case, test plan, test cycle, etc.).

The at least one storage 420 may include one or more storage mediums suitable for storing data, information, and/or computer-readable/computer-executable instructions therein. According to embodiments, the storage 420 may include a random access memory (RAM), a read only memory (ROM), and/or another type of dynamic or static storage device (e.g., a flash memory, a magnetic memory, and/or an optical memory) that stores information and/or instructions for use by the processor 430.

Additionally or alternatively, the storage 420 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 420 may be configured to store computer-executable instructions or programming codes defining one or more of the modules 210-250 (described above with reference to FIG. 2 to FIG. 3B). Further, the storage 420 may be configured to store information to-be utilized by the processor 430 for facilitating automation of test management. For instance, the storage 420 may be configured to store one or more test requirements defined by one or more users, to store one or more system under test and the associated test components or artifacts (e.g., programming codes defining the software to-be tested and/or defining the software to-be interoperated with the software to-be tested, etc.), to store one or more generated test packages and generated test environment configuration files, to store one or more test results, and the like.

The at least one processor 430 may include one or more processors capable of being programmed to perform a function or an operation as described herein. For instance, the processor 430 may be configured to execute computer-readable instructions stored in a storage medium (e.g., storage 420, etc.) to thereby perform one or more actions or one or more operations described herein.

According to embodiments, the processor 430 may be configured to receive (e.g., via the communication interface 410, etc.) one or more signals defining one or more instructions for performing one or more operations. Further, the processor 430 may be implemented in hardware, firmware, or a combination of hardware and software. The processor 430 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the at least one processor 430 may be configured to execute computer-executable instructions stored in at least one memory storage (e.g., storage 420) to thereby perform one or more operations for managing a test for testing software (may be referred to as "system under test" herein) of an embedded system. The software of the embedded system may include an in-vehicle ECU.

According to embodiments, the at least one processor 430 may be configured to: receive, from a user, at least one first user input associated with one or more test requirements; generate, based on the first user input, at least one test package; generate, based on the at least one test package, at least one test environment configuration file; validate the at least one test package and the at least one test environment configuration file; determine a change in the software; and based on determining the change in the software, execute the test according to the validated at least one test package and the validated at least one test environment configuration file.

The software may be associated with (e.g., developed by, managed by, etc.) another user different from the user, and said another user may be located at a geographical location different from the user. Further, the user may access the test automation system 400 via a node (e.g., a user equipment, etc.) different from a node in which the software is deployed or hosted.

According to embodiments, the first user input may include information associated with at least one user-defined test case. In this regard, the at least one processor 430 may be configured to generate the at least one test package by: generating, based on the at least one user-defined test case, at least one test scenario template; obtaining, based on the at least one test scenario template, one or more test package artifacts; and combining the at least one test scenario template with the one or more test package artifacts to generate the at least one test package.

According to embodiments, the at least one processor 430 may be configured to generate the at least one test environment configuration file by: receiving, from the user, at least one second user input associated with at least one user-defined test plan; generating, based on the second user input and the at least one test package, at least one test plan template; generating, by adding the at least one user-defined test case to the at least one test plan template, at least one test plan; receiving, from the user, at least one third user input associated with at least one user-defined test cycle; and generating, based on the third user input and the at least one test plan, the at least one test environment configuration file. In this regard, the at least one test environment configuration file may include information defining configuration of at least one test bench.

According to embodiments, the at least one processor may be configured to validate the at least one test package and the at least one test environment configuration file by: performing a pre-testing on the software based on the at least one test package and the at least one test environment configuration file; presenting, to the user, a result of the pre-testing; receiving, from the user, at least one fourth user input associated with one of: an approval on the result of the pre-testing and a rejection on the result of the pre-testing; based on determining that the fourth user input is associated with the approval, determining that the at least one test package and the at least one test environment configuration file are valid; and based on determining that the fourth user input is associated with the rejection, determining that the at least one test package and the at least one test environment configuration file are invalid.

In some implementations, the pre-testing for validating the at least one test package and the at least one test environment configuration file may be a simplified testing which include testing of only essential features and/or user-specified features, and the pre-testing may be performed at a node different from a node at which the testing executed upon determining the change in the software (e.g., may be referred to as "actual testing" herein). For instance, the pre-testing may be perform locally on the equipment or the work station associated with the user, while the actual testing may be performed at a plurality of nodes dynamically selected by the test automation system on-the-fly according to the real-time or near real-time status (e.g., resource availability, performance metrics, etc.) of the plurality of nodes.

Additionally or alternatively, the at least one processor 430 may be configured to receive the approval/rejection on the result of the pre-testing from another user different from the user. For instance, said another user may be a senior test engineer which is responsible to verify the accuracy of the test package(s) and/or test environment configuration file(s) generated according to the test requirements defined by the user. In this way, said another user may efficiently and effectively ensure that the test requirements are appropriately defined by the user.

According to embodiments, the at least one processor 430 may be configured to determine the change in the software by: obtaining a current status of the software; and comparing the current status with a last known status of the software to determine whether or not the change occurs in the software. The last known status of the software may be pre-obtained by the at least one processor 430 (during previous test cycle).

In some implementations, the change in the software may include a breaking change satisfying one or more conditions defined in the at least one test package. In this regard, the at least one processor 430 may be further configured to determining whether or not the change in the software is a breaking change, upon determining the change in the software. Upon determining that the change in the software is the breaking change, the at least one processor 430 may execute the test. Otherwise, based on determining that the change in the software is not the breaking change, the at least one processor 430 may not execute the test.

According to embodiments, the at least one processor 430 may be configured to execute the test by: generating, based on the validated at least one test environment configuration file, at least one test bench associated with at least one test environment for testing the software; selecting, based on the at least one test bench, at least one node (communicatively coupled to the test automation system 400) which is associated with at least one test environment defined in the at least one test bench; obtaining the software (or the associated programming codes) and the associated test components (e.g., another software which interoperate with the software under test, etc.); deploying the software and the associated test components to the selected at least one node; and performing, based on the validated at least one test package, the test for testing the software in the selected at least one node.

According to embodiments, upon validating the at least one test package and the at least one test environment configuration file, the at least one processor 430 may be further configured to publish the validated at least one test package and the validated at least one test environment configuration file. For instance, the at least one processor 430 may store the validated at least one test package and the validated at least one test environment configuration file to one or more storage mediums (e.g., storage 420, a content hosting server, etc.) which is accessible by other users. In this way, other users may choose to utilize the validated at least one test package and the validated at least one test environment configuration file when required (e.g., when performing a similar testing on the same or similar software, etc.).

According to embodiments, upon executing the test, the at least one processor 430 may be further configured to present one or more test results to the user. For instance, the at least one processor 430 may collect one or more test results associated with the test, may generate at least one graphical user interface (GUI) including the one or more test results, and may present the at least one GUI to the user.

According to embodiments, the at least one processor 430 may be further configured to update the at least one test package and/or the at least one test environment configuration file. For instance, the at least one processor 430 may receive one or more user inputs associated with one or more updated test requirements (e.g., updated test case, updated test plan, updated test cycle, etc.), and may update the at least one test package and/or the at least one test environment configuration file accordingly.

By way of example, in the case of receiving one or more user-defined updated test cases, the at least one processor 430 may update the at least one test package by: generating, based on the one or more user-defined updated test cases, one or more updated test scenario templates, obtaining (e.g., creating, searching, retrieving, etc.) one or more test package artifacts associated with one or more updated test scenario templates from among a plurality of nodes associated with the test automation system (e.g., nodes 120-1 to 120-N), and combining the one or more updated test scenario templates with the one or more test package artifacts to generate one or more updated test packages. According to embodiments, the at least one processor may determine one or more differences among the one or more user-defined updated test cases and the current user-defined test case(s), and may generate the one or more update the test scenario templates by modifying one or more generated test scenario templates to reflect the one or more differences. The at least one test environment configuration file may be updated by the at least on processor 430 in a similar manner.

In view of the above, example embodiments of the present disclosure provide a test automation system which automated the end-to-end processes in managing a test for a user. Specifically, the user may simply provide the intended test requirements (e.g., intended test case, intended test plan, intended test cycle, etc.) to the test automation system, and the test automation system may automatically generate the test package(s) and test environment configuration file(s) based thereon. The user may simply provide the test requirements remotely from an associated node (e.g., a user equipment, a work station, etc.) communicatively coupled to the test automation system (via network 130, etc.), without physically travel to the testing facility as in the related art.

Further, the test automation system may validate the generated test package(s) and/or the generated test environment configuration file(s), before publishing and utilizing the generated test package(s) and the generated test environment configuration file(s) for the actual testing. This may allow the user to ensure that the generated test package(s) and the generated test environment configuration file(s) are accurate, and the user may not need to manually monitor the status of the system under test and manually execute the testing after validating the generated test package(s) and the generated test environment configuration file(s), since the system may automatically perform such operations based on the validated test package(s) and validated test environment configuration file(s).

Furthermore, the test automation system may automatically allocate resources for performing the testing according to the validated test package(s) and validated test environment configuration file(s), without the involvement of the user. The test automation system may dynamically select node(s) which has sufficient resources for performing the test, and may then execute the testing thereon. Subsequently, the test automation system may automatically collect and present the test result(s) to the user.

To this end, the user may simply define the intended test requirements from any suitable node communicatively coupled to the test automation system, and the test automation system may automatically manage the test on-behalf of the user. Accordingly, the testing of software may be managed in an efficient and effective manner, which in turn reduces the user's burden and shorten the development timeframe of the software.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, as described hereinabove, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, implemented by at least one processor, for managing a test for testing software of an embedded system, the method comprising:

receiving, from a user, at least one first user input associated with one or more test requirements;

generating, based on the first user input, at least one test package;

generating, based on the at least one test package, at least one test environment configuration file;

validating the at least one test package and the at least one test environment configuration file;

determining a change in the software; and based on determining the change in the software, executing the test according to the validated at least one test package and the validated at least one test environment configuration file, wherein the software of the embedded system comprises an in-vehicle electronic control unit (ECU).

2. The method according to claim 1, further comprising:

publishing the validated at least one test package and the validated at least one test environment configuration file by: storing the validated at least one test package and the validated at least one test environment configuration file to one or more storage mediums accessible by other users.

3. The method according to claim 1, wherein the first user input comprises information associated with at least one user-defined test case, wherein the generating the at least one test package comprises:

generating, based on the at least one user-defined test case, at least one test scenario template;

obtaining, based on the at least one test scenario template, one or more test package artifacts; and combining the at least one test scenario template with the one or more test package artifacts to generate the at least one test package.

4. The method according to claim 1, wherein the generating the at least one test environment configuration file comprises:

receiving, from the user, at least one second user input associated with at least one user-defined test plan;

generating, based on the second user input and the at least one test package, at least one test plan template;

generating, by adding the at least one user-defined test case to the at least one test plan template, at least one test plan;

receiving, from the user, at least one third user input associated with at least one user-defined test cycle; and generating, based on the third user input and the at least one test plan, the at least one test environment configuration file.

5. The method according to claim 1, wherein the at least one test environment configuration file comprises information defining configuration of at least one test bench.

6. The method according to claim 1, wherein the validating the at least one test package and the at least one test environment configuration file comprises:

performing a pre-testing on the software based on the at least one test package and the at least one test environment configuration file;

presenting, to the user, a result of the pre-testing;

receiving, from the user, at least one fourth user input associated with one of: an approval on the result of the pre-testing and a rejection on the result of the pre-testing;

based on determining that the fourth user input is associated with the approval, determining that the at least one test package and the at least one test environment configuration file are valid; and based on determining that the fourth user input is associated with the rejection, determining that the at least one test package and the at least one test environment configuration file are invalid.

7. The method according to claim 1, wherein the determining the change in the software comprises:

obtaining a current status of the software; and comparing the current status with a last known status of the software to determine whether or not the change occurs in the software.

8. The method according to claim 1, wherein the change in the software comprises a breaking change satisfying one or more conditions defined in the at least one test package.

9. The method according to claim 1, wherein the executing the test comprises:

generating, based on the validated at least one test environment configuration file, at least one test bench associated with at least one test environment for testing the software;

selecting, based on the at least one test bench, at least one node associated with at least one test environment defined in the at least one test bench;

deploying the software to the selected at least one node; and performing, based on the validated at least one test package, the test for testing the software in the selected at least one node.

10. The method according to claim 1, further comprising:

collecting one or more test results associated with the test;

generating at least one graphical user interface (GUI) including the one or more test results; and presenting, to the user, the at least one GUI.

11. A system for managing a test for testing software of an embedded system, the system comprises:

a storage storing instructions; and at least one processor configured to execute the instructions to:

receive, from a user, at least one first user input associated with one or more test requirements;

generate, based on the first user input, at least one test package;

generate, based on the at least one test package, at least one test environment configuration file;

validate the at least one test package and the at least one test environment configuration file;

determine a change in the software; and based on determining the change in the software, execute the test according to the validated at least one test package and the validated at least one test environment configuration file, wherein the software of the embedded system comprises an in-vehicle electronic control unit (ECU).

12. The system according to claim 11, wherein the at least one processor is further configured to execute the instructions to:

publish the validated at least one test package and the validated at least one test environment configuration file by: storing the validated at least one test package and the validated at least one test environment configuration file to one or more storage mediums accessible by other users.

13. The system according to claim 11, wherein the first user input comprises information associated with at least one user-defined test case, and wherein the at least one processor is configured to execute the instructions to generate the at least one test package by:

generating, based on the at least one user-defined test case, at least one test scenario template;

obtaining, based on the at least one test scenario template, one or more test package artifacts; and combining the at least one test scenario template with the one or more test package artifacts to generate the at least one test package.

14. The system according to claim 11, wherein the at least one processor is configured to execute the instructions to generate the at least one test environment configuration file by:

receiving, from the user, at least one second user input associated with at least one user-defined test plan;

generating, based on the second user input and the at least one test package, at least one test plan template;

generating, by adding the at least one user-defined test case to the at least one test plan template, at least one test plan;

receiving, from the user, at least one third user input associated with at least one user-defined test cycle; and generating, based on the third user input and the at least one test plan, the at least one test environment configuration file.

15. The system according to claim 11, wherein the at least one test environment configuration file comprises information defining configuration of at least one test bench.

16. The system according to claim 11, wherein the at least one processor is configured to execute the instructions to validate the at least one test package and the at least one test environment configuration file by:

performing a pre-testing on the software based on the at least one test package and the at least one test environment configuration file;

presenting, to the user, a result of the pre-testing;

receiving, from the user, at least one fourth user input associated with one of: an approval on the result of the pre-testing and a rejection on the result of the pre-testing;

based on determining that the fourth user input is associated with the approval, determining that the at least one test package and the at least one test environment configuration file are valid; and based on determining that the fourth user input is associated with the rejection, determining that the at least one test package and the at least one test environment configuration file are invalid.

17. The system according to claim 11, wherein the at least one processor is configured to execute the instructions to determine the change in the software by:

obtaining a current status of the software; and comparing the current status with a last known status of the software to determine whether or not the change occurs in the software.

18. The system according to claim 11, wherein the change in the software comprises a breaking change satisfying one or more conditions defined in the at least one test package.

19. The system according to claim 11, wherein the at least one processor is configured to execute the instructions to execute the test by:

generating, based on the validated at least one test environment configuration file, at least one test bench associated with at least one test environment for testing the software;

selecting, based on the at least one test bench, at least one node associated with at least one test environment defined in the at least one test bench;

deploying the software to the selected at least one node; and performing, based on the validated at least one test package, the test for testing the software in the selected at least one node.

20. The system according to claim 11, wherein the at least one processor is further configured to execute the instructions to:

collect one or more test results associated with the test;

generate least one graphical user interface (GUI) including the one or more test results; and present, to the user, the at least one GUI.

\* \* \* \* \*